UNITED STATES PATENT OFFICE 2,191,831

MANUFACTURE OF DI-(4-HYDROXY-PHENYL)-DIMETHYL METHANE

Ralph P. Perkins, Midland, Mich., assignor to The Dow Chemical Company, Midland, Mich., a corporation of Michigan No Drawing. Application May 31, 1938, Serial No. 211,042

3 Claims. (Cl. 260—619)

This invention concerns an improved method for manufacturing di-(4-hydroxyphenyl)-dimethyl methane by reaction of phenol with acetone. The product di-(4-hydroxyphenyl)-dimethyl methane is used in the production of synthetic resins. It is sometimes termed "diphenylolpropane" and for convenience will hereinafter be referred to as such.

Diphenylolpropane is usually manufactured by reaction of phenol with acetone in the presence of aqueous hydrochloric acid or other strong mineral acid as a condensing agent. Various conditions for effecting this reaction have heretofore been employed, i. e. it has been carried out in the presence of solvents or diluents such as glacial acetic acid or water at temperatures varying from room temperature to 90° C. or thereabout. Hydrochloric acid is the condensing agent most often used in this reaction, but insofar as I am aware it has always been employed in the form of a concentrated aqueous hydrochloric acid solution. However, the yield of diphenylolpropane obtainable when operating under the conditions heretofore recommended is unsatisfactory, i. e. usually less than 80 per cent of theoretical, or the product obtained is very impure.

I have found that the yield and quality of the diphenylolpropane product are influenced greatly by each of the following factors: reaction temperature, the proportion and concentration of the hydrochloric acid, the relative proportions of phenol and acetone used, the presence of solvents or other diluents, and the procedure followed in carrying out the reaction. In particular, I have found that the yield and quality of said product may be improved greatly over those heretofore obtainable by carrying the reaction of phenol with acetone out under the following set of conditions:

(1) Employing at least 3 moles of phenol per mol of acetone in the reaction;

(2) Employing substantially anhydrous hydrogen chloride as a condensing agent;

(3) Maintaining the mixture at a reaction temperature not exceeding 80° C.; and (4) Carrying the reaction out in the absence, or substantial absence, of solvents or diluents other than the agents involved in the reaction.

By carrying the reaction out under the reaction conditions just listed, a good technical grade of diphenylolpropane may be produced in greater than 90 per cent of the theoretical yield. However, when any of the above operating conditions are varied from the limits just stated, the yield and quality of the product drops rapidly.

In practicing the invention, acetone is mixed with 3 molecular equivalents or more of phenol and substantially anhydrous hydrogen chloride is introduced until the mixture contains at least 0.3 mol of hydrogen chloride per mol of acetone and preferably is saturated therewith. It is advantageous to use the maximum amount of hydrogen chloride when the phenol/acetone ratio is below 4. The phenol may be employed in as great a proportion as desired, but for sake of economy and convenience, I usually use between 3.5 and 8 mols of phenol per mol of acetone. The rate of reaction is higher the greater the proportion of hydrogen chloride used; hence the reaction may advantageously be carried out in a bomb or autoclave and the gaseous hydrogen chloride be introduced under pressure to obtain a higher concentration thereof than is possible at atmospheric pressure. However, the reaction occurs smoothly and satisfactorily at atmospheric pressure.

During the reaction the mixture is stirred and maintained at a temperature below 45° C., preferably between 15° and 30° C., until the product crystallizes forming a heavy slurry or mass which cannot conveniently be stirred. When this point is reached the reaction has progressed sufficiently so that further stirring and maintenance of the low reaction temperature are not required. The mixture then warms spontaneously, usually to a temperature between 40° and 80° C., due probably to further formation and crystallization of the product. When the temperature has reached a maximum and begins to recede, the reaction is practically complete. The time required to complete the reaction need not exceed 12 hours and the reaction may be carried out in less time by operating under pressure in a bomb or autoclave.

The reaction product may be separated and purified in any of the usual ways, e. g. by distilling hydrogen chloride, water formed in the reaction, and unreacted phenol therefrom; by crystallization from a solvent such as dilute acetic acid, chlorobenzene, ethylene dichloride; etc. In practice, I usually dissolve the crude product in a water-immiscible solvent such as benzene, chlorobenzene, orthodichlorobenzene, xylene, or the like, wash the solution with water to remove hydrochloric acid therefrom, and then distill unreacted phenol therefrom under vacuum. This distillation may satisfactorily be completed at a temperature between 170° and 200° C. and an absolute pressure of about 25 millimeters of mercury. The residual product is diphenylolpropane of good quality, usually having a freezing point of about 150°–153° C. and containing about 90–94 per cent by weight or more of the pure compound.

benzene, care being taken to recover the purified product as completely as possible in this operation. The weight, freezing point, and per cent yield of purified diphenylolpropane, based on the acetone employed, are given in the table.

Table

| Exp. No. | Starting materials | | | | | HCl gas, grams | Conc. HCl, grams | Reaction time, hours | Partially purified product | | Purified product | | |
|---|---|---|---|---|---|---|---|---|---|---|---|---|---|
| | Phenol | | Acetone | | Mole ratio Phenol Acetone | | | | Grams | F. P., °C. | Grams | F. P., °C. | Percent yield |
| | Grams | Moles | Grams | Moles | | | | | | | | | |
| 1 | 376.2 | 4 | 57.3 | 1 | 4 | 12.3 | 0 | 40 | 216.8 | 149.4 | 192.0 | 156.5 | 84.9 |
| 2 | 348.2 | 3.7 | 58.2 | 1 | 3.7 | 14.5 | 0 | 40 | 217.7 | 150.0 | 196.7 | 156.7 | 85.8 |
| 3 | 283.2 | 3 | 57.5 | 1 | 3 | 16.8 | 0 | 40 | 212.9 | 149.3 | 187 | 156.7 | 82.7 |
| 4 | 235.6 | 2.5 | 57.4 | 1 | 2.5 | 16.4 | 0 | 40 | 195.6 | 148.2 | 160 | 156.0 | 71 |
| 5 | 375.5 | 4 | 58.0 | 1 | 4 | 0 | 37.4 | 88.5 | 126.7 | 146.0 | 105.0 | 156.2 | 47 |

The impurities in this technical product are probably largely isomeric with diphenylolpropane and do not interfere seriously with its use for the production of resins. If desired, the product may be purified completely by recrystallization from chlorobenzol, dilute acetic acid, or other solvents. The purified product has a freezing point of 156.5–157° C.

The following table describes a number of experiments on the production of diphenylolpropane which were carried out by reacting phenol with acetone in the presence of hydrogen chloride or concentrated aqueous hydrochloric acid under various conditions. Experiments 1, 2, and 3 were carried out according to the invention using substantially anhydrous hydrogen chloride as the condensing agent and employing the other reaction conditions hereinbefore specified. Experiments 4 and 5 were carried out under quite similar conditions except that in each instance at least one of the variable operating conditions which I have found to affect the yield of the product was outside the operating limit for said variable condition required by the invention. These experiments 4 and 5 describing the results of operation outside the scope of the invention are presented for purpose of comparison with experiments 1–3.

Each experiment of the table was carried out at room temperature or thereabout for the reaction period stated. The procedure, in all instances, was to mix phenol and acetone in the amounts stated, add gaseous hydrogen chloride or 36 per cent by weight concentrated aqueous hydrochloric acid, while stirring and cooling the mixture to a temperature of 18°–20° C., until the mixture contained the amount thereof given in the table. The mixture was then allowed to stand, without further stirring, until termination of the reaction period stated. This reaction period includes the time required for introducing the hydrogen chloride or hydrochloric acid as well as that required for subsequent reaction. After completing the reaction, the mixture was dissolved in chlorobenzene and washed nearly free of hydrogen chloride with water, after which the chlorobenzene and unreacted phenol were removed by distillation. This distillation was started at atmospheric pressure and completed at approximately 25 millimeters absolute pressure and a final distilling temperature of about 170° C. The residual product was in each instance partially purified diphenylolpropane of fair quality. The table gives the weight and freezing point of this partially purified product. The product was further purified by recrystallization from chloro- In the foregoing table, experiments 1 to 3, which were conducted in accordance with the invention, show that, provided the molecular ratio of phenol to acetone is at least 3, the particular ratio used does not greatly affect the yield or purity of the product. In contrast, a comparison of experiment 3 with experiment 4 shows that when this ratio is reduced from 3 to 2.5 under otherwise similar operating conditions, the yield is reduced greatly. Comparison of experiment 5 with experiments 1 to 3 demonstrates that the substitution of concentrated aqueous hydrochloric acid, in place of the substantially anhydrous acid required by the invention, causes a great reduction in the yield of diphenylolpropane.

The experiments in the foregoing table are laboratory experiments carried out under carefully controlled conditions for the purpose of ascertaining the effect of changes in certain of the variable operating conditions on the yields of product. The following example illustrates the procedure followed and the yield of diphenylolpropane obtainable in the larger scale production of diphenylolpropane according to the invention:

*Example*

Gaseous hydrogen chloride was passed gradually into a mixture of 527 pounds (5.61 mols) of phenol and 82 pounds (1.41 mols) of acetone while stirring and maintaining the mixture at temperatures between 15° and 20° C. A total of 28 pounds of hydrogen chloride was added in a period of 5.5 hours. The stirring was continued as long as possible during the subsequent reaction. Approximately 2.5 hours after completing the addition of hydrogen chloride, a spontaneous rise in temperature and crystallization of the product was observed. The temperature reached a maximum of 53° C. approximately 8.5 hours after crystallization was first observed, but the mixture was permitted to stand an additional hour so as to assure complete reaction. The mixture was then dissolved with heating in 250 pounds of chlorobenzene and washed with two 120 pound portions of nearly boiling water to remove hydrogen chloride therefrom. The chlorobenzene layer was next neutralized, and water, chlorobenzene, and some phenol were distilled off at atmospheric pressure. The pressure was then reduced and the distillation continued until phenol no longer distilled from the mixture, the final distilling temperature and pressure being 170° C. and 25 millimeters, respectively. As residue from the distillation there was obtained 313.7 pounds of diphenylolpropane having a freezing point of 151.4 to 152.1° C. This product contained not over 8 per cent by weight of impurities. The yield of at least 92 per cent pure product was 97.3 per cent of theoretical on a basis of the acetone initially employed. The content of diphenylolpropane in the product corresponded to a yield of at least 89.5 per cent of the pure compound on the same basis.

As hereinbefore pointed out, the reaction for the production of diphenylolpropane is preferably carried out under as nearly anhydrous conditions as possible in the absence of added solvents or diluents, since solvents or diluents tend to inhibit the desired reaction and lower the yield. However, the presence of from 1 to 10 per cent by weight of an inert organic solvent such as chlorobenzene, glacial acetic acid, etc., may be tolerated without excessive lowering of the yield. The mixture should, as hereinbefore stated, be practically free of water other than that formed by the reaction. Accordingly, the expression "substantially free of solvents", as herein employed, means that the reaction mixture shall contain not more than 10 per cent by weight of any added solvent or diluent other than the chemical agents required for the reaction, i. e. phenol, acetone, and hydrogen chloride.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making diphenylolpropane by reacting phenol with acetone, the step of carrying the reaction out in the substantial absence of solvents, i. e. in the presence of less than 10 per cent by weight of solvent, employing at least 3 molecular equivalents of phenol per mole of acetone in the reaction mixture and using substantially anhydrous hydrogen chloride to promote the reaction.

2. In a method of making diphenylolpropane by reacting phenol with acetone, the step of carrying the reaction out in the substantial absence of solvents i. e. in the presence of less than 10 per cent by weight of solvent and nearly to completion at a temperature not exceeding 80° C. using substantially anhydrous hydrogen chloride to promote the reaction and employing at least 3 molecular equivalents of phenol per mole of acetone.

3. In a method of making diphenylolpropane by reacting phenol with acetone, the steps of carrying the reaction out in the absence of added solvents, at a temperature which does not exceed 45° C. until crystallization of the product occurs, using at least 3 molecular equivalents of phenol per mole of acetone and employing at least 0.3 mole of substantially anhydrous hydrogen chloride per mole of acetone to promote the reaction.

RALPH P. PERKINS.